Patented Feb. 6, 1923.

1,444,068

UNITED STATES PATENT OFFICE.

HARRY D. GIBBS, OF PENNSGROVE, NEW JERSEY, ASSIGNOR TO E. I. DU PONT DE NEMOURS & COMPANY, OF WILMINGTON, DELAWARE, A CORPORATION OF DELAWARE.

PROCESS OF MANUFACTURING ANTHRAQUINONE AND PHTHALIC ANHYDRIDE.

No Drawing. Application filed November 14, 1921. Serial No. 514,933.

*To all whom it may concern:*

Be it known that I, HARRY D. GIBBS, a citizen of the United States, and a resident of Pennsgrove, in the county of Salem and State of New Jersey, have invented a certain new and useful Process of Manufacturing Anthraquinone and Phthalic Anhydride, of which the following is a specification.

My invention relates to the concurrent production of anthraquinone and phthalic anhydride from anthracene press cake, and comprises subjecting the latter in vapor form, either with or without prior removal of carbazole, to the action of an oxidation catalyst.

Heretofore, anthraquinone has been produced by the high temperature, catalytic air oxidation of anthracene, the anthracene being in a more or less high state of purity; that is, from 70 to 100% anthracene.

I have now discovered that anthraquinone can be produced efficiently from anthracene press cake by the oxidation of the anthracene in the press cake; that phthalic anhydride is produced at the same time by the oxidation of the phenanthrene in the press cake; and that the carbazole present in the press cake may be recovered by prior separation before the substances are passed over the catalyst, or, allowing the carbazole to remain, a large proportion thereof passes over the catalyst unchanged and can be recovered along with the products of oxidation.

My invention may be illustrated by the following example:

The anthracene press cake, which will contain from 30–40% anthracene and 20–30% carbazole, the remainder consisting of phenanthrene and other dead oils, is mixed with an amount of alkali, either caustic soda or caustic potash, sufficient to unite with the carbazole to form the sodium or potassium salt of carbazole and leave a small excess of the alkali. This mixture is then passed through a vaporizing apparatus in a continuous manner where it is heated to a temperature of about 200°, sometimes as high as 300°, and a current of air passed over this mixture. The air stream mixes with the vaporized materials, consisting of anthracene, phenanthrene, and other products of the dead oils, and this gas stream is passed in contact with the catalyst, which is held at a temperature of from about 300 to 500°, and preferably, at about 400° C. The products of the reaction are then condensed in any suitable condenser.

The best catalyst that I have found for this operation consists of oxides of vanadium, for example, vanadic oxide, although oxides of molybdenum or chromium may be employed for the purpose. In general I may use any catalytic compound of a metal of one of the fifth, sixth and eighth groups of the periodic system.

The sodium or potassium salt of the carbazole in the above example does not vaporize but is removed from the vaporizer and the carbazole recovered by a separate operation.

The products of the reaction are condensed and consist of phthalic anhydride, anthraquinone, and some other products. A separation of these valuable products is best performed by washing out the acids with a solution of an alkali, as for example sodium carbonate, thereby forming the sodium salt of the acids which go into solution in the water. The anthraquinone, being insoluble, is removed by filtration. The anthraquinone thus removed by filtration may, if desired, be purified by a further process, preferably by sublimation to separate it from any unoxidized material.

Although the above example describes the new process in detail, it will be understood that various changes in operating conditions may be resorted to without departing from my invention. Thus, instead of air, I may use oxygen gas alone or mixed with one or more inert gases, the resulting is in either case being referred to as an oxygen-containing gas.

I claim:—

1. A process of concurrent y producing anthraquinone and phthalic anhydride which comprises vaporizing the anthracene and phenanthrene components of anthracene press cake and subjecting said vapors in contact with gaseous oxygen to the action of an oxidation catalyst at a temperature of from about 300 to 500° C.

2. A process of concurrently producing anthraquinone and phthalic anhydride and phenanthrene components of anthracene and phenanthrene components of anthracene press cake and subjecting said vapors in contact with gaseous oxygen to the action of an oxide of vanadium at a temperature of from about 300 to 500° C.

3. A process of concurrently producing anthraquinone and phthalic anhydride which comprises vaporizing the anthracene and phenanthrene components of anthracene press cake, mixing said vapors with air, and passing the resulting vapor mixture into contact with a catalytic compound of a metal of one of the fifth, sixth, and eighth groups of the periodic system while maintaining said catalytic compound at a temperature between 300 and 650° C.

4. A process of concurrently producing anthraquinone and phthalic anhydride from anthracene press cake which comprises treating the latter with sufficient caustic alkali to convert the carbazole present into a relatively non-volatile salt, heating the thus treated press cake in a current of air to vaporize the constituents of the press cake other than the carbazole salt, and passing the resulting vapor mixture into contact with a catalytic compound of a metal of one of the fifth, sixth, and eighth groups of the periodic system while maintaining said catalytic compound at a temperature between 300 and 650° C.

In testimony whereof I affix my signature.

HARRY D. GIBBS.

Certificate of Correction.

It is hereby certified that in Letters Patent No. 1,444,068, granted February 6, 1923, upon the application of Harry D. Gibbs, of Pennsgrove, New Jersey, for an improvement in "Processes of Manufacturing Anthraquinone and Phthalic Anhydride," an error appears in the printed specification requiring correction as follows: Page 1, line 106, claim 2, strike out the words "and phenanthrene components of anthracene" and insert instead *which comprises vaporizing the anthracene;* and that the said Letters Patent should be read with this correction therein that the same may conform to the record of the case in the Patent Office.

Signed and sealed this 27th day of February, A. D., 1923.

[SEAL]

KARL FENNING,
*Acting Commissioner of Patents.*